United States Patent [19]
Dowling et al.

[11] 3,818,323
[45] June 18, 1974

[54] TEMPERATURE-STABILIZED LOGGING SONDE
[75] Inventors: Donald J. Dowling; John F. Boyd; James A. Fuchs, all of Houston, Tex.
[73] Assignee: Texaco, Inc., New York, N.Y.
[22] Filed: Feb. 9, 1973
[21] Appl. No.: 331,145

[52] U.S. Cl. ..................................... 324/6, 336/57
[51] Int. Cl. .......................... G01v 3/10, G01v 3/18
[58] Field of Search ............ 324/5, 6, 10, 8; 336/57

[56] References Cited
UNITED STATES PATENTS
| | | | |
|---|---|---|---|
| 2,640,869 | 6/1953 | Zimmerman | 324/5 |
| 2,964,698 | 12/1960 | Lehmberg | 324/10 |
| 3,152,303 | 10/1964 | Lary et al. | 336/57 X |
| 3,454,914 | 7/1969 | Merkl | 336/57 |
| 3,581,194 | 5/1971 | Tegholm | 324/6 |
| 3,629,758 | 12/1971 | Pearce | 336/57 |

*Primary Examiner*—Gerard R. Strecker
*Attorney, Agent, or Firm*—T. H. Whaley; C. G. Reis

[57] ABSTRACT

A logging sonde for deep-well measurement. It is for determining electromagnetic properties of formations adjacent to the walls of the borehole. Such properties include magnetic susceptibility and/or resistivity as determined by electromagnetic induction. The sonde structure has a hollow core with transmitter and receiver coils wound thereon. The core contains a circulating fluid, and there is means for establishing and maintaining a constant temperature in order to stabilize the electrical properties of the sonde.

5 Claims, 3 Drawing Figures

PATENTED JUN 18 1974    3,818,323

TEMPERATURE-STABILIZED LOGGING SONDE

BACKGROUND OF THE INVENTION

1. Field of the Invention

This invention concerns deep-well logging, in general. More specifically, it relates to construction of an electromagnetic logging sonde which provides temperature stabilization for the logging system.

2. Description of the Prior Art

Heretofore, it has been recognized that temperature changes affect the results in deep-well logging systems. However, the only known attempt to deal with this difficulty has been a logging system that includes temperature compensation. Specifically, such system makes use of an electrical bridge circuit in which an electromagnetic winding is located. There is a temperature-sensitive resistance element which is also located in the bridge. However, it is located on the opposite side of the bridge from the winding. While such arrangement may have provided some improvement, it has been found that temperature effects include changes in the physical dimensions of coils and the like, and such changes would not be adequately compensated by the prior arrangement.

It has been observed by authorities in the field of induction logging that the signal voltage induced in the receiver coil is directly affected by the physical location of the coils relative to one another. Also, the signal voltage induced in the receiver coil which is in phase with the excitation current is related to the transmitter-receiver coil spacing by a reciprocal factor. This factor may be expressed by the fraction $1/L$ where L represents the spacing in meters. In addition, where the signal voltage induced in the receiver coil is in quadrature phase with the transmitter excitation current, the coil-spacing relationship factor may be expressed by the fraction $1/L^3$. Consequently, in connection with susceptibility logging in particular, the signals developed are especially sensitive to coil spacing.

For the foregoing reasons, this invention is beneficial in that it permits stabilizing the effects of ambient and self-generated temperature changes that are encountered downhole. Consequently, it is an object of this invention to provide improved structure for an electromagnetic logging sonde in order to provide effective temperature stabilization.

SUMMARY OF THE INVENTION

Briefly, this invention concerns an improved temperature-stabilized logging sonde. The sonde comprises in combination a hollow core having a transmitter coil and a receiver coil wound thereon, a circulating fluid in said hollow core, and means for maintaining the temperature of said fluid constant.

Again, briefly, the invention concerns an improved temperature-stabilized logging sonde that comprises in combination a predetermined length of nonmagnetic mandrel tubing having a transmitter coil and a receiver coil wound thereon, and fluid-tight end pieces for closing the interior of said mandrel tubing. It also comprises thermally conductive oil filling said mandrel tubing, and a pump for circulating said oil within said mandrel. In addition, it comprises an AC electric motor for driving said pump, first nonmagnetic tubing for connecting the discharge of said pump to one end of said mandrel tubing, and second nonmagnetic tubing for connecting the suction of said pump to the other end of said mandrel tubing. It also comprises a nonmagnetic casing for enclosing the elements of said sonde therein, and a nonmagnetic thermal barrier tube inside of and spaced from said casing and surrounding said mandrel and coils. In addition, it comprises an AC electric heater for raising the temperature of said oil adjacent to the inlet of said mandrel, a temperature sensor located in contact with said oil circulating from said mandrel, and AC zero-crossing means for regulating said heater in accordance with said temperature sensor.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein.

DESCRIPTION OF THE PREFERRED EMBODIMENTS

As indicated above, it has been found in deep-well logging and, particularly, in electromagnetic induction-type logging that the changes in temperature which are encountered downhole tend to adversely affect the logging sonde. Such effect may be sufficient to cause the desired signal which is developed to be masked, or even to develop spurious signals due to the changes in ambient temperature (which may amount to many degrees Fahrenheit). Such temperature effects are particularly objectionable in connection with electromagnetic susceptibility logging because of the fact that the signals of concern in such logging are quadrature-voltage signals with respect to the transmitter excitation current.

Another aspect of temperature-dependence to which measurement systems of this type are sensitive, is in the thermal instability of the coils themselves and the changes in self-inductance they undergo because of changes in ambient temperature. Such effects along with any electronic circuitry-temperature effects all combine to lower the signal to noise ratio of the measuring system, thereby reducing the overall system sensitivity and resolution.

Figure 1:
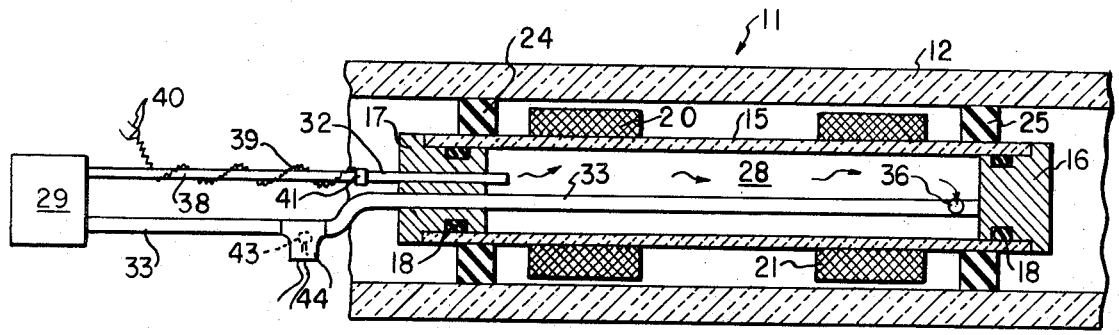
FIG. 1 is a schematic longitudinal cross-section, showing a portion of a logging sonde according to the invention.

Referring to FIG. 1, there is schematically illustrated a portion of a logging sonde 11 which has a nonmagnetic-material casing 12 within which is located a mandrel tubing 15. This mandrel 15 is hollow and has two end pieces 16 and 17 which are fitted into the open ends of the tubing 15 with seals 18, in order to maintain a fluid-tight interior. The mandrel tubing 15 is made of nonmagnetic material, and it has a transmitter coil 20 and a receiver coil 21 wound thereon.

It is pointed out that the receiver and transmitter coils are interchangeable, and it will be appreciated by those skilled in this art that the spacing will be adjusted to provide penetration as desired into the borehole walls. Furthermore, it should be noted that both the receiver and transmitter coils might, in practice, each be made up of several separate coils. Such systems of coils would be used in order to provide for focusing or other effects, as desired. However, the concept of this invention would not be changed, and consequently the more simple illustration has been made.

The mandrel 15 and the coils 20, 21 are all axially mounted within the casing 12 by means of annular spacers 24 and 25. These spacers are preferably made of a resilient material which is nonmagnetic such as rubber, or the like.

As indicated above, there is a hollow interior 28 of the mandrel 15. Filling this space, there is a thermal fluid that is preferably a thermally conductive oil. This fluid is pumped and circulates over the full length of the interior 28 of the mandrel 15. Such pumping may be carried out by means of any feasible pump 29. It will be appreciated that the pump 29 might be part of a motor-pump unit, and preferably the motor should be an AC type in order to eliminate the DC motor commutator brush electrical noise.

The pump portion of motor-pump unit 29 has a discharge port (not shown) connected to a length of nonmagnetic tubing 32 that extends through the end piece 17 and discharges adjacent that end of the interior 28 of mandrel 15. In order to provide for circulation over the entire length of the mandrel 15, there is another length of nonmagnetic tubing 33 that has an opening 36 near the other end piece 16. Consequently, the oil circulating in space 28 will flow from the discharge end of tubing 32 along the length of mandrel 15 to the opening 36 in the tubing 33. Tubing 33 extends back through the end piece 17 and on to a suction port (not shown) of the pump portion of unit 29.

In order to apply heat to raise the temperature of the oil in space 28, there is a heating element 39. This might take various forms but, as schematically indicated, is a wrap-around heater strip that is applied to a metallic tubing section 38 which is connected to the tubing 32 by a joint 41. The tubing 32 is preferably a plastic material, e.g., neoprene, while the section 38 is a good thermal conductor for transferring heat to the oil flowing therethrough. Electric power is applied to the heating element 39 via a pair of wires 40.

In order to control the temperature of the oil in space 28, energization of the heating element 39 is controlled by a temperature sensor 43. The sensor 43 may be located in any appropriate place for measuring the temperature of the oil as it leaves the space 28 inside of the mandrel 15. In the illustration there is shown a fluid well incorporated in a coupling 44 that is situated in the tubing 33. The coupling 44 has an open interior or well which contains the sensor 43 therein.

As indicated above, the pump of the motor-pump unit 29 may be driven by any appropriate motive power source. Preferably, the pump is a magnetically driven sealless type in order to minimize the chance for leaks of the hydraulic (thermal) fluid into the sonde. Also, the motor is preferably an AC type, as above indicated.

Since the temperature regulation involves periodic energization and deenergization of the heating element 39, it is preferable that this element be controlled from AC power so that this power-interruption type of control may be done without switching transients. Thus, by making use of available electronic equipment, the energization and deenergization of the heater 39 may be done with zero-crossing controls which will eliminate switching transient signals.

Figure 2:
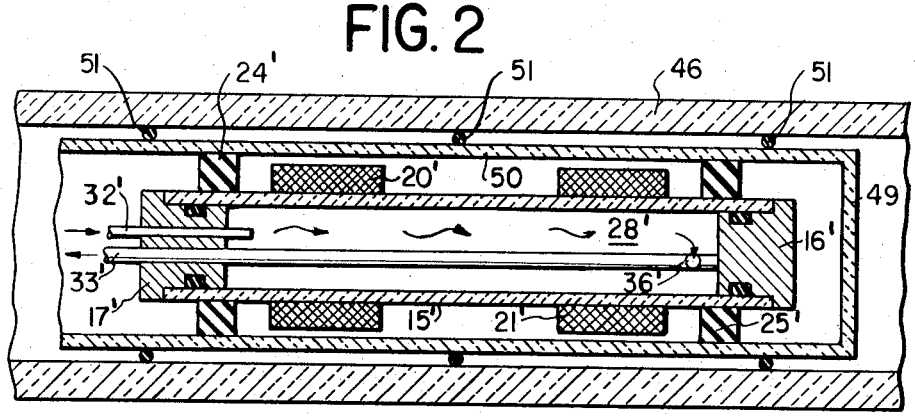
FIG. 2 is a similar longitudinal cross-section, illustrating a modified embodiment of a sonde according to the invention.
Figure 3:
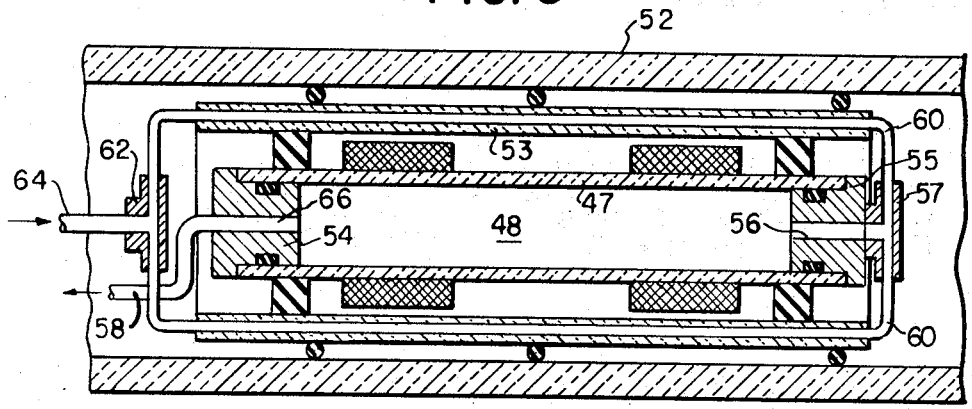
FIG. 3 is still another longitudinal cross-section, illustrating yet another modification in accordance with the invention.

FIGS. 2 and 3 illustrate modifications of a sonde according to the invention. Thus, in FIG. 2, there is a sonde having a casing 46 which corresponds to the casing 12 of the FIG. 1 modification. However, inside of casing 46, there is a nonmagnetic thermal barrier tube 50 that is mounted inside of the casing 46. The barrier tube 50 has a closed end 49 and is spaced from the inside of the casing by means of a plurality of O-rings 51.

Inside the barrier tube 50, there is a similar arrangement of hollow mandrel and coils and related parts as the corresponding elements in FIG. 1. Consequently, the same reference numbers but with a prime mark are employed in FIG. 2, and no additional explanation is needed. The thermal barrier tube 50 provides additional insulation, and it will be noted that (as in FIG. 1) there is a dead-air spacing around the mandrel 15' and the coils 20', 21' wound thereon. Such dead-air space is within the barrier tube 50.

In the FIG. 3 modification, there is an outer casing 52 that corresponds with the casing 46 of FIG. 2. Also, there is a thermal barrier tube 53 which corresponds with the tube 50 of FIG. 2. However, in the FIG. 3 modification, the tube 53 has channels buried therein for carrying the heated oil which is being circulated into a hollow space 48 within a mandrel tube 47 which corresponds with the mandrels 15 and 15' of the other figures.

In the FIG. 3 modification, there is an end piece 54 that is located at one end of the mandrel 47. However, in this case, there is only a single tube 58 that goes through the end piece 54. The circulating oil is introduced at the other end of the mandrel 47 through another end piece 55. There is a passage 56 through the end piece 55, and it is connected with a T-connector 57 that has plural tubes 60 connected thereto. The tubes 60 are embedded in the thermal barrier 53 in order to reduce the heat loss from the coil system and to improve the temperature stability. It will be appreciated that they might be embedded in different ways, e.g., by being set in helical turns (not shown). However, as illustrated, the tubes 60 go parallel to the axis of the barrier 53.

At the other end of the thermal barrier 53 the tubes 60 rejoin at another T-connector 62, where a tubing 64 joins them. Tubing 64 corresponds with the tubing 32 or 32' of the FIGS. 1 and 2 in that it leads from the output of the circulating pump.

Thus, the heated oil flows through the barrier tube 53 within tubes 60 and then via the passage 56 into space 48 at the right-hand end, as viewed in FIG. 3. Thereafter, it flows along the length of space 48 to a passage 66 that has the tube 58 connected to it for carrying the oil back to the suction of the pump.

While the invention has been described above in considerable detail and in accordance with the applicable statutes, this is not in any way to be taken as limiting the invention but merely as being descriptive thereof.

We claim:
1. An improved temperature-stabilized sonde, comprising in combination
   a hollow core having a transmitter coil and a receiver coil wound thereon, a circulating fluid in said hollow core,
means for maintaining the temperature of said fluid constant,
a casing for enclosing said core and coils,
means for mounting said core and coils axially within said casing,
means for introducing said circulating fluid adjacent one end of said core,
means for withdrawing said circulating fluid adjacent the other end of said core from said introducing end,
thermal barrier means for heat-insulating said core and coils from said casing,
said thermal barrier means comprising
an enclosure surrounding said core and coils,
means for spacing said enclosure from the inside of said casing, and
said means for introducing circulating fluid comprising
a passage within the walls of said enclosure.

2. A logging sonde according to claim 1, wherein said core and said enclosure are nonmagnetic.

3. A logging sonde according to claim 2, wherein said temperature is maintained at a level above the anticipated maximum in a well to be logged.

4. A logging sonde according to claim 3, wherein said circulating fluid is oil.

5. An improved temperature-stabilized logging sonde, comprising in combination a predetermined length of nonmagnetic mandrel tubing having a transmitter coil and a receiver coil wound thereon,
fluid-tight end pieces for closing the interior of said mandrel tubing,
thermally conductive oil filling said mandrel tubing,
a pump for circulating said oil within said mandrel tubing,
an AC electric motor for driving said pump,
first nonmagnetic tubing for connecting the discharge of said pump to one end of said mandrel tubing,
second nonmagnetic tubing for connecting the suction of said pump to the other end of said mandrel tubing,
a nonmagnetic casing for enclosing the elements of said sonde therein,
a nonmagnetic thermal barrier tube mounted inside of and spaced from said casing and surrounding said mandrel tubing and coils,
an AC electric heater for raising the temperature of said oil adjacent to the inlet to said mandrel tubing,
a temperature sensor located in contact with said oil circulating from said mandrel tubing, and
AC zero-crossing means for regulating said heater in accordance with said temperature sensor.

* * * * *